United States Patent
Lee et al.

(10) Patent No.: US 8,126,211 B2
(45) Date of Patent: Feb. 28, 2012

(54) POINTING DEVICE AND MOTION VALUE CALCULATING METHOD THEREOF

(75) Inventors: Bang-Won Lee, Yongin-si (KR);
Woo-Seok Lee, Yongin-si (KR);
Jong-Taek Kwak, Seongnam-si (KR);
Wan-Gyo Jeong, Seongnam-si (KR)

(73) Assignee: ATLab Inc. (KR)

( * ) Notice: Subject to any disclaimer, the term of this patent is extended or adjusted under 35 U.S.C. 154(b) by 944 days.

(21) Appl. No.: 12/128,794

(22) Filed: May 29, 2008

(65) Prior Publication Data

US 2008/0273756 A1   Nov. 6, 2008

(51) Int. Cl.
*G06K 9/00* (2006.01)
(52) U.S. Cl. .......................... 382/107; 382/103
(58) Field of Classification Search .......... 382/100, 382/103, 107
See application file for complete search history.

(56) References Cited

U.S. PATENT DOCUMENTS

| | | | |
|---|---|---|---|
| 6,335,977 B1 * | 1/2002 | Kage | 382/107 |
| 7,398,683 B2 * | 7/2008 | Lehtonen | 73/514.32 |
| 7,474,197 B2 * | 1/2009 | Choi et al. | 340/384.7 |
| 7,777,649 B2 * | 8/2010 | De Ruyter et al. | 341/20 |
| 2001/0009414 A1 * | 7/2001 | Badyal et al. | 345/163 |
| 2008/0225000 A1 * | 9/2008 | Bellwood et al. | 345/158 |
| 2009/0160773 A1 * | 6/2009 | Bohn et al. | 345/166 |

FOREIGN PATENT DOCUMENTS

| KR | 1020020041234 | 6/2002 |
|---|---|---|
| KR | 1020050070212 | 7/2005 |
| KR | 1020050091260 | 9/2005 |
| KR | 1020060093877 | 8/2006 |

* cited by examiner

*Primary Examiner* — Andrew W Johns
*Assistant Examiner* — Shefali Goradia
(74) *Attorney, Agent, or Firm* — Cantor Colburn LLP

(57) ABSTRACT

A pointing device is provided. A sensor generates a motion detection signal by sensing motion. A calculator receives the motion detection signal, calculates a motion value based on the motion detection signal, calculates a conversion motion value base on an angle of the motion value, and outputs the conversion motion value. An interface outputs the motion conversion value inputted from the calculator. By limiting a motion angle, the pointing device can provide a positioning operation suitable for a motion intended by a user. The user can optionally use a motion control method in all directions according to need.

13 Claims, 12 Drawing Sheets

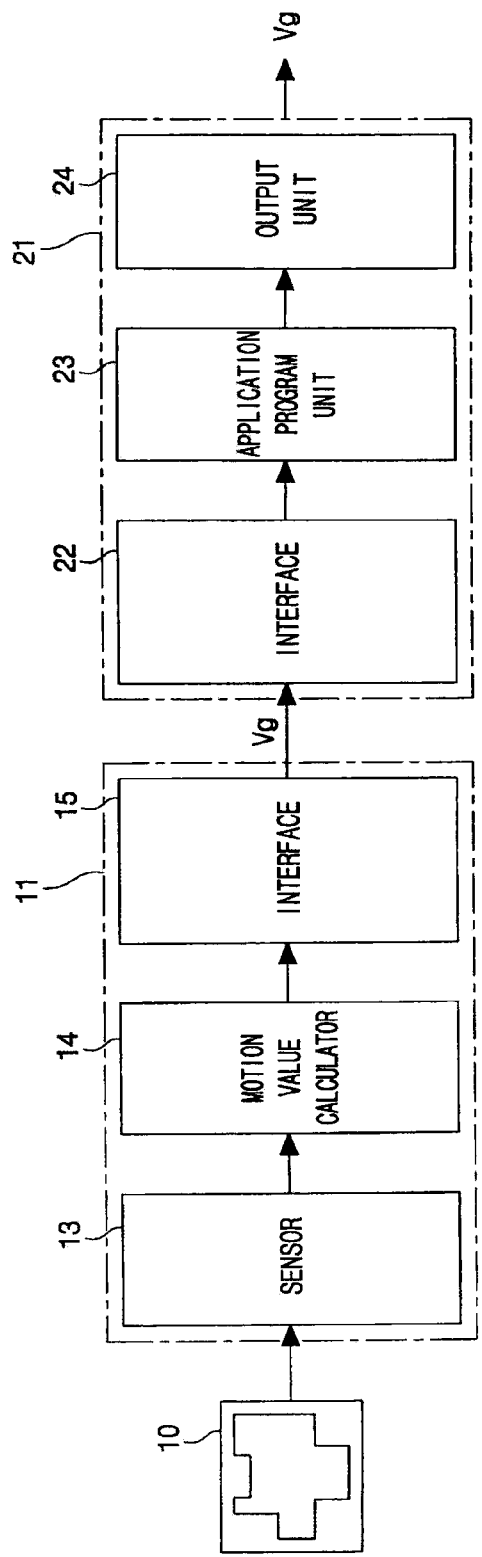

FIG. 5
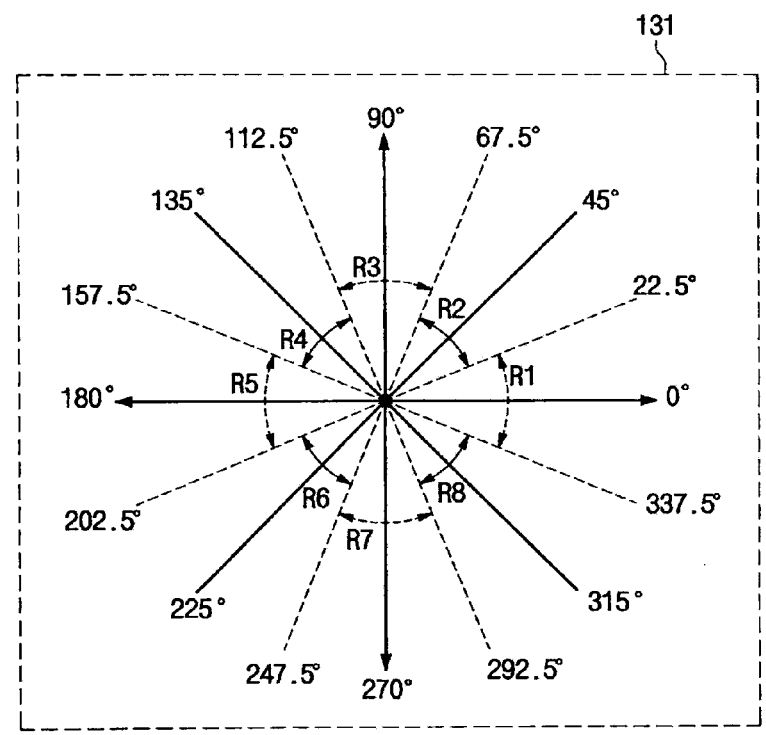
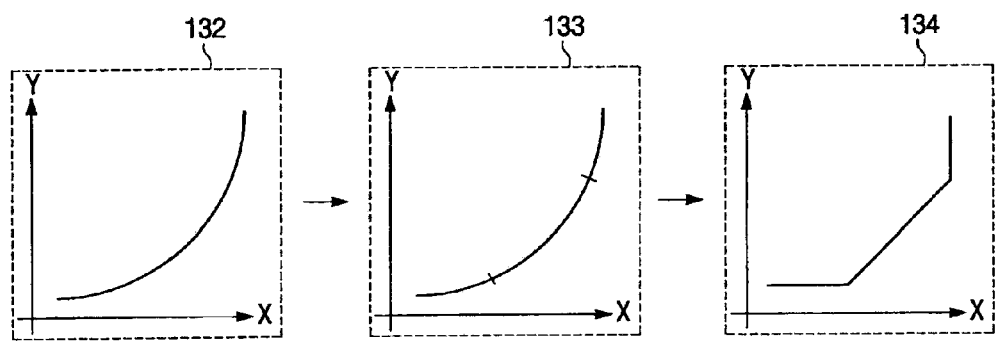

POINTING DEVICE AND MOTION VALUE CALCULATING METHOD THEREOF

BACKGROUND OF THE INVENTION

1. Field of the Invention

The present invention relates to a pointing device, and more particularly, to a method for calculating a motion value by sensing motion variation of an object and an apparatus for tracking a movement position of the object according to the motion value.

2. Description of the Related Art

In general, types of pointing devices include optical pointing devices, mechanical pointing devices, human interface devices using the human body, etc. A representative example of an optical pointing device is an optical mouse, a representative example of a mechanical pointing device is a ball mouse, and a representative example of a human interface device is a touch screen.

In the optical mouse, light radiated from a light source is reflected from an object and sensed by an image sensor. Images of the object are configured with detection data. The images configured in time bands are compared. A direction and distance of movement are computed by tracking the movement of the object.

In the ball mouse, a direction and distance of movement are computed from a rotation distance and direction of a rotated ball.

A (resistive) touch screen detects a position when finger pressure is applied by installing a sensor line sensitive to pressure on a screen surface, and computes a movement direction and distance by tracking a movement path.

FIG. 1 is a block diagram showing an example of a conventional optical pointing device using an image sensor. An object 10, an optical pointing device 11, and a control device 21 are shown in FIG. 1. The optical pointing device 11 includes a sensor 13, a motion value calculator 14, and an interface 15. The control device 21 includes an interface 22, an application program unit 23, and an output unit 24.

An operation of the conventional optical pointing device using the image sensor of FIG. 1 will be described.

The sensor 13 generates an analog signal based on an amount of light by receiving the light reflected from the object 10 using an image sensor (not shown).

The motion value calculator 14 includes an analog-to-digital (A/D) converter (not shown), an input frame memory (not shown), a reference frame memory (not shown), and an image processor (not shown).

The A/D converter converts an analog signal received from the sensor 13 into a digital signal. The input frame memory stores the digital signal output from the A/D converter. The reference frame memory stores previous frame data before current frame data. The image processor computes and outputs a motion value Vg by receiving and comparing reference frame data from the reference frame memory and the current frame data from the input frame memory.

The interface 15 of the optical pointing device 11 receives the motion value Vg from the motion value calculator 14 and transmits the received motion value Vg to an external control device (for example, a computer).

The interface 22 of the control device 21 receives the motion value Vg from the optical pointing device 11.

The application program unit 23 receives the motion value Vg from the interface 22 of the control device 21 and directly outputs the motion value Vg to the output unit 24. The application program unit 23 may comprise memory that stores an application program.

The output unit 24 outputs the motion value Vg inputted from the application program unit 23 to a monitor (not shown), such that a user may read the motion value Vg.

FIG. 2A is a diagram for explaining an image mapping method of the motion value calculator 14 of FIG. 1, and shows a method for comparing reference frame data 31 and input frame data 32.

The image mapping method for computing a motion value Vg from an image of an object will be described with reference to FIG. 2A.

The reference frame data 31 is image data one step ahead of the current-step input frame data 32, and is stored in the reference frame memory. Part of the reference frame data 31 is set to mask window data 38. The input frame data 32 serving as image data in the current step is stored in the input frame memory.

The mask window data 38 of the reference frame data 31 is compared with the input frame data 32 in a mask window unit. The mask window data 38 moves pixel by pixel on total input frame data, and is compared with the input frame data to compute a correlation value. That is, a correlation value is computed by comparing the mask window data 38 of the reference frame data 31 with the first region of the input frame data 32. After a one pixel shift, a correlation value is computed by comparing with the second region of the input frame data 32. This process is repeated up to the N-th region of the input frame data 32. A motion value Vg about X and Y axes is generated with respect to a position where the correlation value is greatest, and the motion value Vg is transmitted to the control device 21 via the interface 15.

FIG. 2B shows graphs of operation regions of the conventional optical pointing device. In FIG. 2B, a actual motion graph 36 and a motion value graph 37 are shown.

The actual motion graph 36 represents the motion of object as X- and Y-axis displacements in an X-Y coordinate system. The motion value graph 37 represents a motion value computed by sensing an image of the motion of the object using the optical pointing device 11 of FIG. 1 in the X-Y coordinate system.

As shown in the actual motion graph 36 and the motion value graph 37 of FIG. 2B, when a motion value calculating method of the conventional optical pointing device is used, the actual motion of the object is the same as the motion computed by the conventional optical pointing device.

The above-described motion value calculating method may be advantageous in a mouse, one type of pointing device, and may be disadvantageous in a mobile phone using a touch screen, another type of pointing device. For example, when a mobile phone equipped with a touch screen is used, a pointer of the touch screen may be unintentionally shifted by the user's thumb when the mobile phone is held in the hand. To move the pointer on the touch screen of the mobile phone horizontally, the finger in contact with the touch screen should move horizontally, but this is difficult because the finger generally moves on an angle. So, the pointer may not move as intended by the user, and the user's thumb may get tired.

SUMMARY OF THE INVENTION

The present invention provides a pointing device that can limit a motion angle when it makes a motion value output.

The present invention also provides a motion value calculating method of a pointing device that can limit a motion angle.

According to an aspect of the present invention, there is provided a pointing device including: a sensor that generates a motion detection signal by sensing motion; a calculator that receives the motion detection signal, calculates a motion value based on the motion detection signal, calculates a conversion motion value based on an angle of the motion value, and outputs a conversion motion; and an interface that outputs the conversion motion value inputted from the calculator.

The sensor may include: an image sensor that receives light reflected from an object and outputs the motion detection signal corresponding to an amount of light received.

The sensor may include: lower electrodes arranged on a lower side; a movable upper electrode arranged on an upper side and having a capacitance value with respect to the lower electrodes; and a capacitance sensor that outputs the capacitance value, which varies when the upper electrode is moved in response to a control motion of a user, as the motion detection signal.

The capacitance sensor may be connected to a bar handle that is movable by the user, and may be connected to an elastic material, wherein the upper electrode may be located at a center position of the lower electrodes when no force is applied.

The calculator may include: a motion value calculator that receives the motion detection signal, calculates the motion value by comparing a current motion detection signal with a previous motion detection signal, and outputs the motion value; and a conversion motion value calculator that receives the motion value, calculates the conversion motion value based on the angle of the motion value, and outputs the conversion motion value The motion value calculator may include: an analog-to-digital (A/D) converter that receives the motion detection signal and converts it into a digital signal; a memory that receives and stores a current digital signal and a previous digital signal output from the A/D converter; and an image processor that receives the current digital signal and the previous digital signal from the memory, calculates the motion value by comparing the current digital signal with the previous digital signal, and outputs the motion value.

The conversion motion value calculator may include: a motion-direction calculating module that divides an angle of 360 degrees into a plurality of angle regions, sets a representative angle of each region, calculates a conversion motion-direction value based on the representative angle by computing the angle of the motion value, and outputs the conversion motion-direction value; a motion-magnitude calculating module that receives the motion value, computes a horizontal component and a vertical component of the motion value, calculates a conversion motion-magnitude value by modifying the horizontal component and/or the vertical component, and outputs the conversion motion-magnitude value; and an output control module that outputs the conversion motion value by combining the conversion motion-direction value and the conversion motion-magnitude value.

When the angle of the motion value is located in a hysteresis angle region, the motion-direction calculating module may set a previous conversion motion-direction value to the conversion motion-direction value.

The motion-magnitude calculating module may additionally receive the conversion motion-direction value, compute a magnitude of the motion value, and modify the horizontal component and/or the vertical component to components of coordinates that has the closest magnitude to the magnitude of the motion value among coordinates of the conversion motion-direction value, respectively.

The motion-magnitude calculating module may additionally receive the conversion motion-direction value, and modify the horizontal component and/or the vertical component to components of the closest coordinates to coordinates corresponding to the motion value among coordinates of the conversion motion-direction value, respectively.

When the closest coordinates to coordinates corresponding to the motion value is two, the motion-magnitude calculating module may select coordinates close to coordinates corresponding to previous conversion motion value, and modify the horizontal component and/or the vertical component to components of selected coordinates, respectively.

The motion-magnitude calculating module may calculate the conversion motion-magnitude value by reducing the horizontal component and/or increasing the vertical component The pointing device may further include: a motion-magnitude calculating module that receives the conversion motion value from the calculator and outputs the conversion motion value to the interface after performing at least one of an operation for adjusting a horizontal component of the conversion motion value to be smaller than a vertical component and an operation for adjusting the vertical component to be smaller than the horizontal component.

According to another aspect of the present invention, there is provided a pointing device including: a sensor that generates a motion detection signal by sensing motion; a calculator that receives the motion detection signal, computes a motion value based on the motion detection signal, calculates a conversion motion value based on the motion value, and outputs the conversion motion value; and an interface that outputs the conversion motion value inputted from the calculator.

The calculator may include: a motion value calculator that receives the motion detection signal, calculates the motion value by comparing a current motion detection signal with a previous motion detection signal, and outputs the motion value; and a conversion motion value calculator that receives the motion value, computes a horizontal component and a vertical component of the motion value, calculates the conversion motion value by modifying the horizontal component and/or the vertical component, and outputs the conversion motion value.

The conversion motion value calculator may calculate the conversion motion value by reducing the horizontal component and/or increasing the vertical component.

According to still another aspect of the present invention, there is provided a pointing device including: an interface that receives a motion value from a device that outputs the motion value, and outputs the motion value; an application program unit that receive the motion value from the interface, computes an angle of the motion value, computes a conversion motion value based on the angle of the motion value, and outputs the conversion motion value; and an output unit that receives the conversion motion value from the application program unit and outputs a video signal corresponding thereto.

The application program unit may divide an angle of 360 degrees into a plurality of angle regions, set a representative angle of each region, calculate a conversion motion-direction value based on the representative angle by computing the angle of the motion value, compute a horizontal component and a vertical component of the motion value, calculate a conversion motion-magnitude value by modifying the horizontal component and/or the vertical component referring to the conversion motion-direction value, and output the conversion motion value by combining the conversion motion-direction value and the conversion motion-magnitude value.

The application program unit may output the conversion motion value after reducing a horizontal component of the conversion motion value and/or increasing a vertical component of the conversion motion value.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram showing an example of a conventional optical pointing device using an image sensor;

FIG. 5 shows graphs of a motion-direction calculating method of the conversion motion value calculator according to an exemplary embodiment of the present invention;

DETAILED DESCRIPTION OF THE INVENTION

A motion value calculating method and a pointing device using the same according to exemplary embodiments of the present invention will be described in detail below with reference to the accompanying drawings.

Figure 2A:
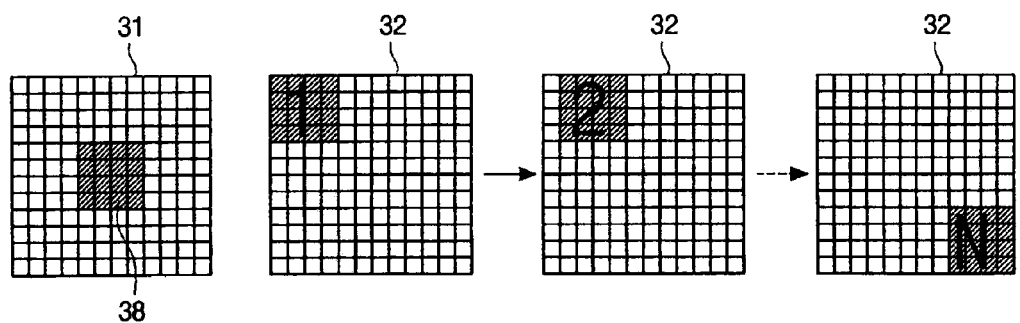
FIG. 2A is a diagram showing an image mapping method of a motion value calculator of FIG. 1.
Figure 2B:
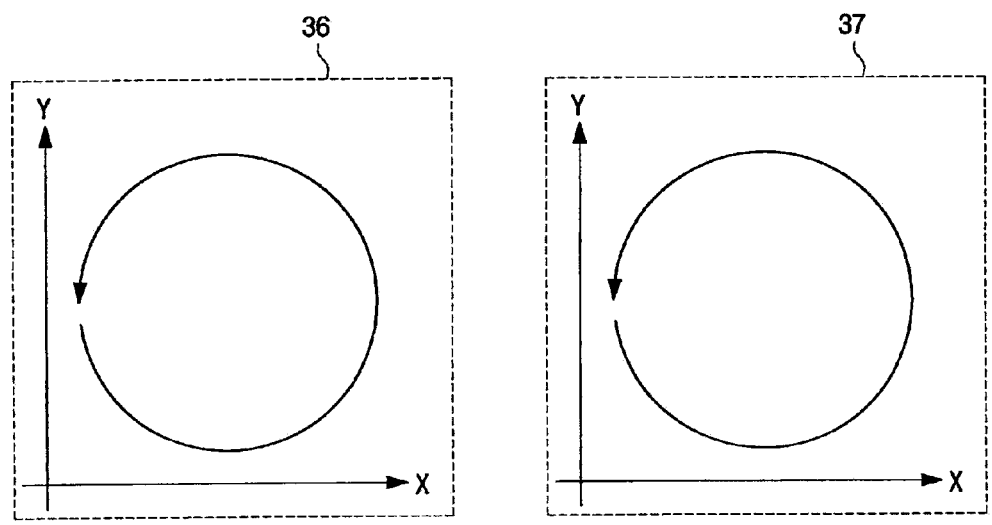
FIG. 2B shows graphs of operation regions of the conventional optical pointing device.
Figure 3:
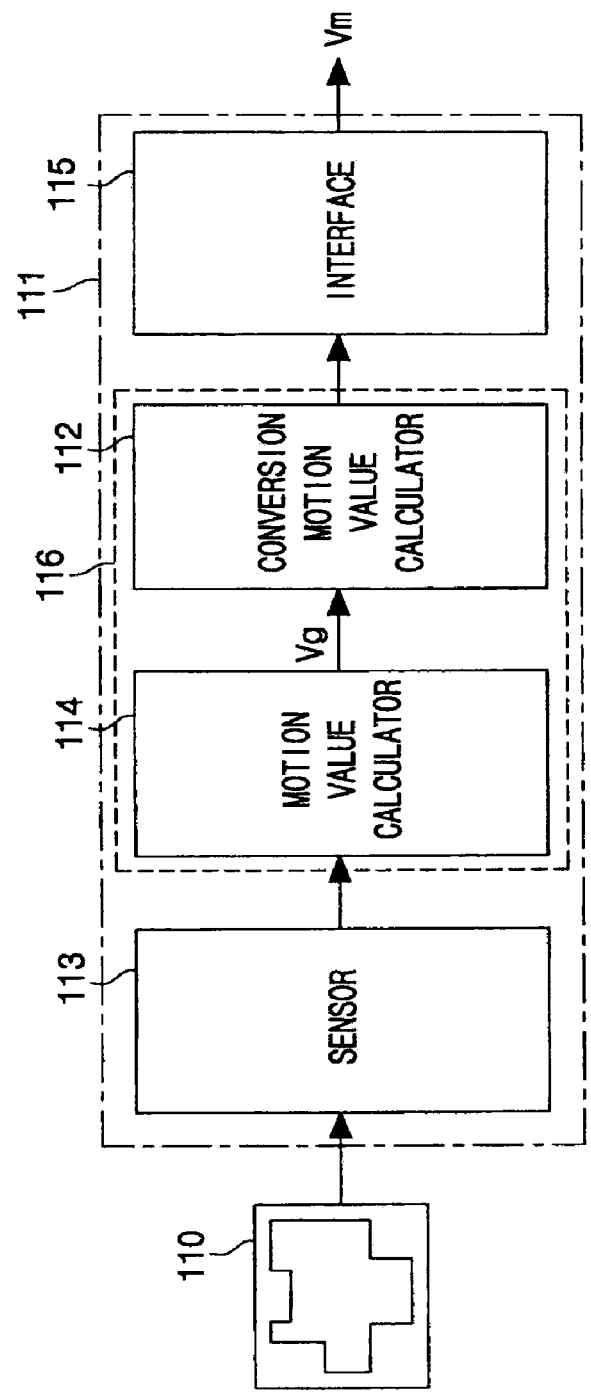
FIG. 3 is a block diagram of a pointing device according to a first exemplary embodiment of the present invention.

FIG. 3 is a block diagram of a pointing device according to a first exemplary embodiment of the present invention. In FIG. 3, an object 110 and a pointing device 111 are shown. The pointing device 111 includes a sensor 113, a calculator 116, and an interface 115. The calculator 116 includes a motion value calculator 114 and a conversion motion value calculator 112.

An operation of the optical pointing device of FIG. 3 will be described.

The sensor 113 receives the light reflected from the object 110, and generates an analog signal based on an amount of light reflected from the object 110.

The calculator 116 includes the motion value calculator 114 for receiving the analog signal from the sensor 113 and outputting a motion value Vg, and the conversion motion value calculator 112 for receiving the motion value Vg from the motion value calculator 114 and outputting a conversion motion value Vm based on an angle and magnitude of the motion value Vg.

The motion value calculator 114 includes an A/D converter (not shown), an input frame memory (not shown), a reference frame memory (not shown), and an image processor (not shown).

The A/D converter converts an analog signal received from the sensor 113 into a digital signal. The input frame memory stores the digital signal output from the A/D converter as a current frame data. The reference frame memory stores previous frame data before current frame data as a reference frame data. The image processor receives the reference frame data from the reference frame memory and the current frame data from the input frame memory, and computes a motion value Vg by comparing the reference frame data with the current frame data, and outputs the motion value Vg.

The conversion motion value calculator 112 receives the motion value Vg from the motion value calculator 114, calculates a conversion motion-direction value by computing an angle of the motion value Vg and a conversion motion-magnitude value by varying the magnitude of the motion value Vg, and outputs a conversion motion value Vm by combining the conversion motion-direction value and the conversion motion-magnitude value.

The interface 115 receives the conversion motion value Vm from the conversion motion value calculator 112 and transmits the conversion motion value Vm to an external control device (not shown; for example, a computer).

Figure 4:
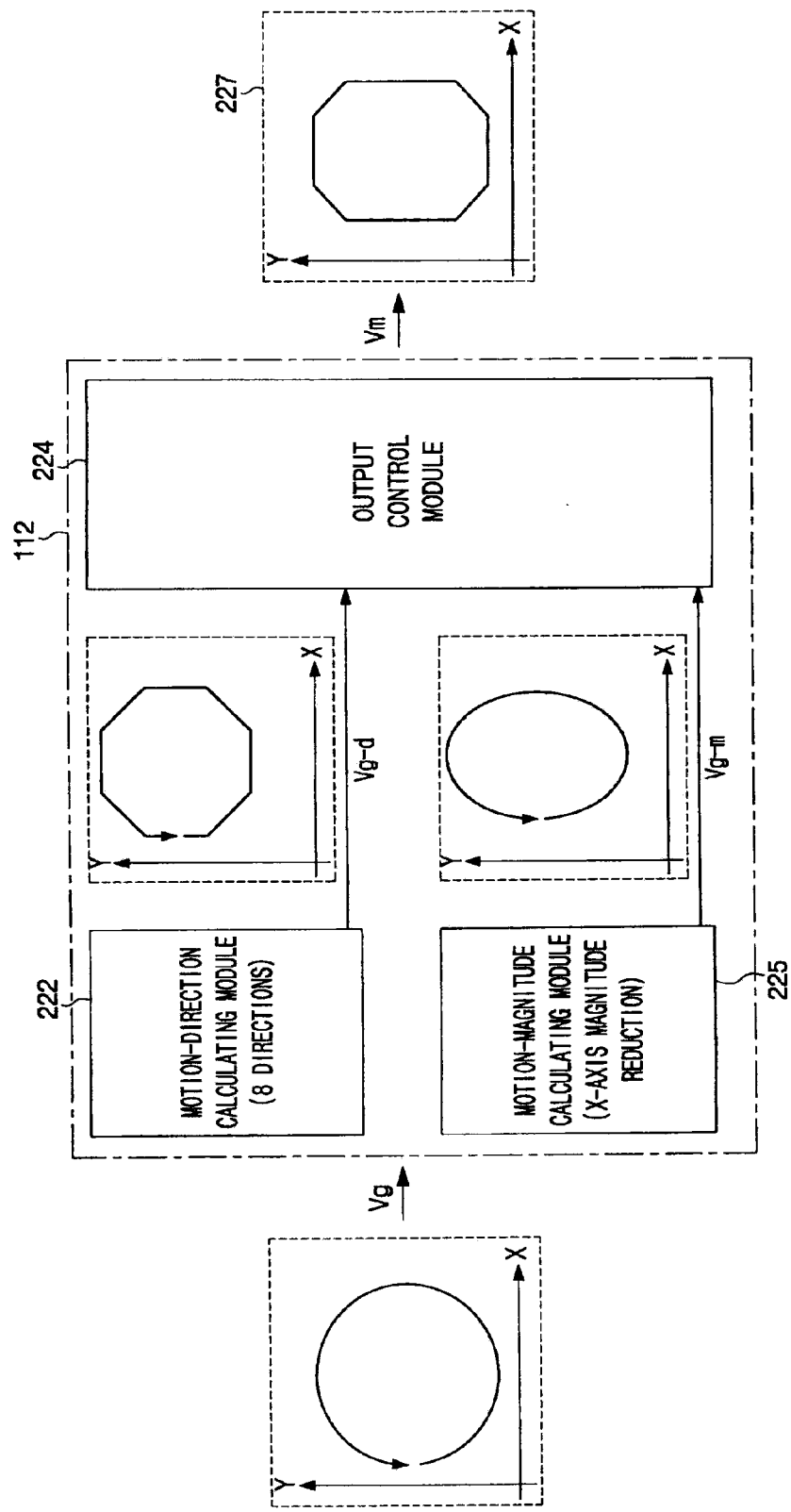
FIG. 4 is a block diagram of a conversion motion value calculator of the pointing device according to an exemplary embodiment of the present invention.

FIG. 4 is a block diagram of the conversion motion value calculator of the pointing device according to an exemplary embodiment of the present invention. The conversion motion value calculator 112 includes a motion-direction calculating module 222, a motion-magnitude calculating module 225, and an output control module 224.

An operation of the conversion motion value calculator 112 of FIG. 4 will be described with reference to FIG. 3

The motion-direction calculating module 222 receives a motion value Vg output from the motion value calculator 114, computes an angle of the motion value Vg, calculates a conversion motion-direction value Vg–d in four or eight directions by limiting the angle of the motion value Vg, and outputs the conversion motion-direction value Vg–d.

The motion-magnitude calculating module 225 receives the motion value Vg from the motion value calculator 114, computes the an X- or Y-axis value of the motion value Vg, calculates a conversion motion-magnitude value Vg–m by varying the X- or Y-axis value, and outputs the conversion motion-magnitude value Vg–m. The motion-magnitude calculating module 225 may additionally receive the conversion motion-direction value Vg–d from the motion-direction calculating module 222.

The output control module 224 outputs the conversion motion value Vm by receiving and combining the conversion motion-direction value Vg–d output from the motion-direction calculating module 222 and the conversion motion-magnitude value Vg–m output from the motion-magnitude calculating module 225.

Alternatively, the motion-magnitude calculating module 225 may output the conversion motion value Vm by receiving the conversion motion-direction value Vg–d output from the motion-direction calculating module 222 and combining the conversion motion-direction value Vg–d and the conversion motion-magnitude value Vg–m computed by the motion-magnitude calculating module 225. Alternatively, the motion-magnitude calculating module 225 may be located outside the conversion motion value calculator 112 and may receive the conversion motion value Vm and vary its magnitude. Alternatively, the conversion motion value calculator 112 may be located inside the motion value calculator 114.

FIG. 5 shows graphs of a motion-direction calculating method of the conversion motion value calculator according to an exemplary embodiment of the present invention. In FIG. 5, an angle graph 131 and graphs 132~134 are shown.

The motion-direction calculating method of FIG. 5 will be described with reference to FIG. 3.

In the angle graph 131, an angle of the X-Y coordinate system is divided into 45° segments. 337.5°~22.5° is set to R1 having a center angle of 0° (hereinafter, referred to as R1 (0°)), 22.5°~67.5° is set to R2 having a center angle of 45° (hereinafter, referred to as R2 (45°)), 67.5°~112.5° is set to R3 having a center angle of 90° (hereinafter, referred to as R3 (90°)), 112.5°~157.5° is set to R4 having a center angle of 135° (hereinafter, referred to as R4 (135°), 157.5°~202.5° is set to R5 having a center angle of 180° (hereinafter, referred to as R5 (180°)), 202.5°~247.5° is set to R6 having a center angle of 225° (hereinafter, referred to as R6 (225°)), 247.5°~292.5° is set to R7 having a center angle of 270° (hereinafter, referred to as R7 (270°)), and 292.5°~337.5° is set to R8 having a center angle of 315° (hereinafter, referred to as R8 (315°)). The center angles of R1~R8 are set to representative angles.

Among graphs 132~134, the motion value graph 132 represents motion values output from the motion value calculator 114, the angle mapping graph 133 represents angles mapped to the motion values of the motion value graph 132 using the angle graph 131, and the angle conversion graph 134 represents the representative angles of R1~R8 of the angle graph 131 with which the angles of the angle mapping graph 133 are replaced. The angles mapped to the motion values of the motion value graph 132 can be computed by:

$$\theta = \arctan(dy/dx).$$

In the motion-direction calculating method described with reference to FIG. 5, the conversion motion value calculator 112 receives the motion value Vg output from the motion value calculator 114 of FIG. 3, computes an angle of the motion value Vg with respect to the origin (0°), calculates a conversion motion-direction value by replacing the angle with a representative angle of R1~R8.

In the motion-direction calculating method of FIG. 5, to convert the angle of motion value Vg into the representative angle of R1~R8, a problem may be caused when the angle of motion value Vg is located at a boundary between two of R1~R8.

For example, when an angle of the motion value corresponds to an angle of 22.5°, it could be mapped to either R1 (0°) of 337.5°~22.5° or R2 (45°) of 22.5°~67.5°. At an angle of ±5° in the vicinity of the boundary, the conversion motion-direction value may be unstable due to a steep variation between R1 (0°) and R2 (45°).

To stably calculate the conversion motion-direction value in the vicinity of the boundary as described above, the conversion motion-direction value can be calculated by setting a hysteresis region in the vicinity of the boundary or computing the average value of conversion motion-direction values for a given time.

Now, the method using the hysteresis region will be described. For example, when the angle of the motion value Vg is located in the hysteresis region of 22.5°±5° (for example, 22.5°) and a previous conversion motion-direction value is R1 (0°), the conversion motion-direction value is set to the previous conversion motion-direction value of R1 (0°).

Next, the method for computing the average value of conversion motion-direction values for the given time will be described. For example, when the angle of the motion value Vg corresponds to 22.5° and the frequency of R1 (0°) is less than that of R2 (45°) among previous conversion motion-direction values for the given time, the conversion motion-direction value is set to the conversion motion-direction value of R2 (45°).

In the angle graph 131 of FIG. 5, the angle of the X-Y coordinate system is divided into 45° segments. 337.5°~22.5° is set to R1 (0°), 22.5°~67.5° is set to R2 (45°), 67.5°~112.5° is set to R3 (90°), 112.5°~157.5° is set to R4 (135°), 157.5°~202.5° is set to R5 (180°), 202.5°~247.5° is set to R6 (225°), 247.5°~292.5° is set to R7 (270°), and 292.5°~337.5° is set to R8 (315°), such that the center angles of R1~R8 are set to the representative angles and the conversion motion-direction value is calculated in the eight directions. When the angle of the X-Y coordinate system is divided into 90° segments, 315°~45° is set to R1 (0°), 45°~135° is set to R2 (90°), 135°~225° is set to R3 (180°), and 225°~315° is set to R4 (270°), such that the center angles of R1~R4 are set to representative angles and the conversion motion-direction value is calculated in the four directions.

In an exemplary embodiment of the present invention, it is assumed that the method using the hysteresis region is employed between the two methods for converting the motion value at a boundary.

Figure 6:
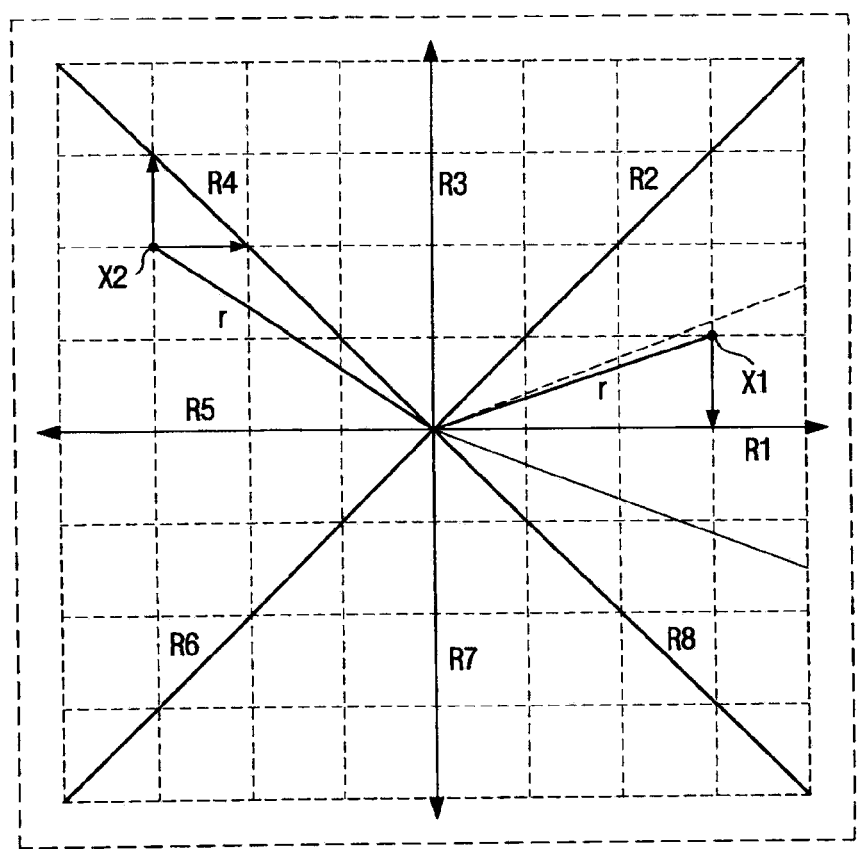
FIG. 6 shows a specific position mapping method of the motion direction control method of FIG. 5.

FIG. 6 shows a graph of a motion-magnitude calculating method of the conversion motion value calculator according to an exemplary embodiment of the present invention. An example of the motion-magnitude calculating method when motion values are X1 and X2 will be described.

The motion-magnitude calculating method can use a method for mapping magnitudes r between the origin and the motion values X1 and X2 to selected angle regions, or a method for mapping referring to coordinates of previous conversion motion values.

For example, the method for mapping the magnitudes r between the origin and the motion values X1 and X2 to the selected angle regions will be described.

When the motion value X1 corresponds to coordinates (3, 1), the magnitude and angle thereof are computed by:

$$r = \sqrt{(3^2 + 1^2)} = \sqrt{10} \approx 3,\ \theta = \arctan(1/3) = 18.43495°.$$

Since the angle of the motion value X1 is located in the hysteresis region of $(22.5° - 5°) < \theta < (22.5° + 5°)$, according to the above-described motion-direction calculating method, the angle of the motion value X1 is converted into a previous conversion motion-direction value. When the previous conversion motion-direction value is R1 (0°), the angle of the motion value X1 is converted into the conversion motion-direction value R1 (0°). That is, the angle of the conversion motion value(that is, conversion motion-direction value) of the motion value X1 is R1 (0°).

The conversion motion value corresponds to coordinates on R1 (0°) that have the closest magnitude to the magnitude of the motion value X1. So, the conversion motion value of the motion value X1 corresponds to coordinates (3, 0). That is, the magnitude of the conversion motion value of the motion value X1 is the magnitude of coordinates (3, 0).

When the previous conversion motion-direction value is R2 (45°), the angle of the motion value X1 is converted into the conversion motion-direction value R2 (45°), and the conversion motion value of the motion value X1 corresponds to coordinates (2, 2).

When the motion value X2 corresponds to coordinates (−3, 2), the magnitude and angle thereof are computed by:

$$r = \sqrt{(3^2 + 2^2)} = \sqrt{13} \approx 4,\ \theta = \arctan(2/3) = 146.3099°.$$

According to the motion-direction calculating method, the angle of the motion value X2 is converted into the conversion motion-direction value R4 (135°) of 112.5°~157.5°. And, the conversion motion value of the motion value X2 corresponds to coordinates (−3, 3).

According to the method for mapping magnitudes r between the origin and the motion values X1 and X2 to selected angle regions, coordinates corresponding to the conversion motion value of the motion values X1 and X2 are mapped to coordinates of the closest magnitude to the magnitudes r of conversion motion-direction values.

Next, the method for mapping the magnitudes of the motion values X1 and X2 by referring to the coordinates of previous conversion motion values will be described.

When the motion value X1 corresponds to coordinates (3, 1), the angle thereof is computed by:

$$\theta = \arc\tan(1/3) = 18.43495°.$$

Since the angle of the motion value X1 is located in the hysteresis region of $(22.5°-5°)<\theta<(22.5°+5°)$, the angle of the motion value X1 is converted into a previous motion-direction conversion value according to the above-described motion-direction calculating method.

When the previous conversion motion value corresponds to coordinates (2, 0), the angle of the motion value X1 is converted into the conversion motion-direction value R1 (0°) of 337.5°~22.5°.

At this time, the conversion motion value corresponds to the coordinates closest to the coordinates of the motion value X1. Therefore, the conversion motion value of the motion value X1 corresponds to the coordinates (3, 0).

When the previous conversion motion value corresponds to the coordinates (1, 1), the conversion motion value of the motion value X1 corresponds to the coordinate (2, 2).

When the motion value X2 corresponds to coordinates (−3, 2), an angle thereof is computed by:

$$\theta = \arc\tan(2/-3) = 146.3099°.$$

According to the motion-direction calculating method, the angle of the motion value X2 is converted into the conversion motion-direction value R4 (135°) of 112.5°~157.5°.

When the previous conversion motion value corresponds to coordinates (−1, 1), the conversion motion value of the motion value X2 corresponds to the closest coordinates to the coordinates of the motion value X2 among the coordinates of R4. If the closest coordinates is two, select the coordinates closest to the coordinates corresponding to the previous conversion motion value. Therefore, the conversion motion value of the motion value X2 corresponds to the coordinates (−2, 2).

According to the method for mapping coordinates of the conversion motion value of the motion values X1 and X2 by referring to the coordinates of previous motion values, the coordinates of the conversion motion value of the motion values X1 and X2 are mapped to coordinates of selected angle regions closest to the motion value and the previous conversion motion values.

Between the two motion-magnitude calculating methods described above, it is assumed that the present invention uses the method for mapping the magnitude of a motion value by referring to the coordinates of a previous conversion motion value.

Figure 7:
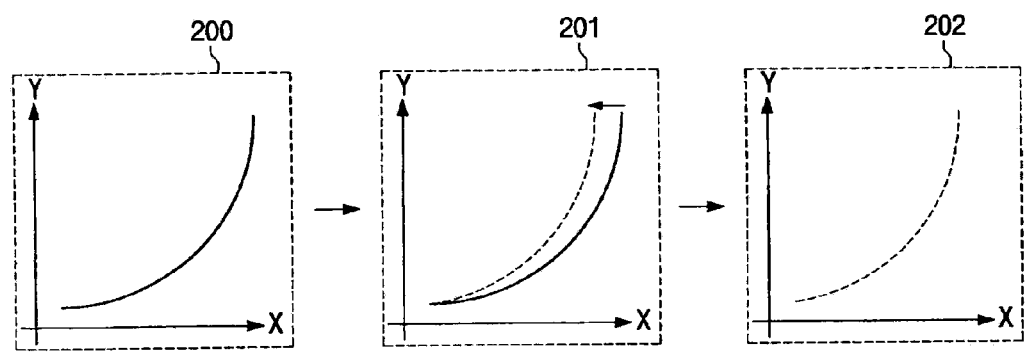
FIG. 7 shows a graph of a motion-magnitude calculating method of the motion controller according to an exemplary embodiment of the present invention.

FIG. 7 shows graphs of a scaling method capable of enlarging or reducing the magnitude of a motion value in the motion-magnitude calculating methods of FIG. 6. In FIG. 7, a motion value graph 200, a scaling status graph 201, and a scaling completion graph 202 are shown.

The motion-magnitude scaling method of FIG. 7 will be described with reference to FIG. 3 and Table 1.

TABLE 1

| $X_{out} = X_{in} \times 0.6$ | | |
|---|---|---|
| $Y_{out} = Y_{in} \times 1.0$ | | |
| Motion input | Motion output | |
| X axis, Y axis | X axis | Y axis |
| 0 | 0 | 0 |
| 1 | 1 | 1 |
| 2 | 1 | 2 |
| 3 | 2 | 3 |
| 4 | 2 | 4 |
| 5 | 3 | 5 |
| 6 | 4 | 6 |
| 7 | 4 | 7 |
| 8 | 5 | 8 |
| 9 | 5 | 9 |
| 10 | 6 | 10 |
| ... | ... | ... |

The motion value graph 200 represents a motion value of the object according to X- and Y-axis displacements in the X-Y coordinate system. The scaling status graph 201 represents scaled motion magnitude in the X-Y coordinate system computed by multiplying a motion value output from the motion value calculator 114 of FIG. 3 by predetermined ratios computed using the equations included in Table 1, or detecting a motion output mapped to a motion input from a generated table like Table 1. The scaling completion graph 202 represents an enlarged or reduced motion of the object according to the X- and Y-axis displacements in the X-Y coordinate system.

The motion-magnitude calculating method of FIG. 7 can perform the enlargement or reduction operation on the X axis, the Y axis, or both the X and Y axes.

Figure 8:
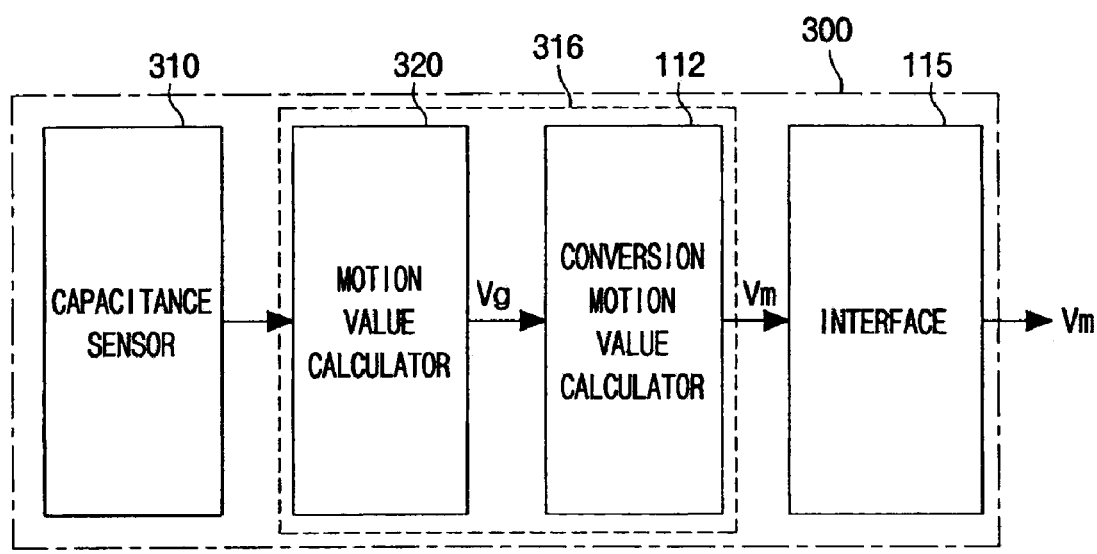
FIG. 8 is a block diagram of a pointing device according to a second exemplary embodiment of the present invention.

FIG. 8 is a block diagram of a pointing device according to a second exemplary embodiment of the present invention. A pointing device 300 includes a capacitance sensor 310, a calculator 316, and an interface 115. The calculator 316 includes a motion value calculator 320 and a conversion motion value calculator 112.

The pointing device 300 of FIG. 8 will be described.

Since the conversion motion value calculator 112 and the interface 115 of FIG. 8 have the same construction and function as those of FIG. 3, their descriptions are omitted.

The capacitance sensor 310 outputs a varied capacitance value under control of a user.

The motion value calculator 320 receives capacitance values output from the capacitance sensor 310, compares a current capacitance value with a previous capacitance value, computes a motion angle and magnitude according to the user's motion, and outputs a motion value Vg.

Figure 9:
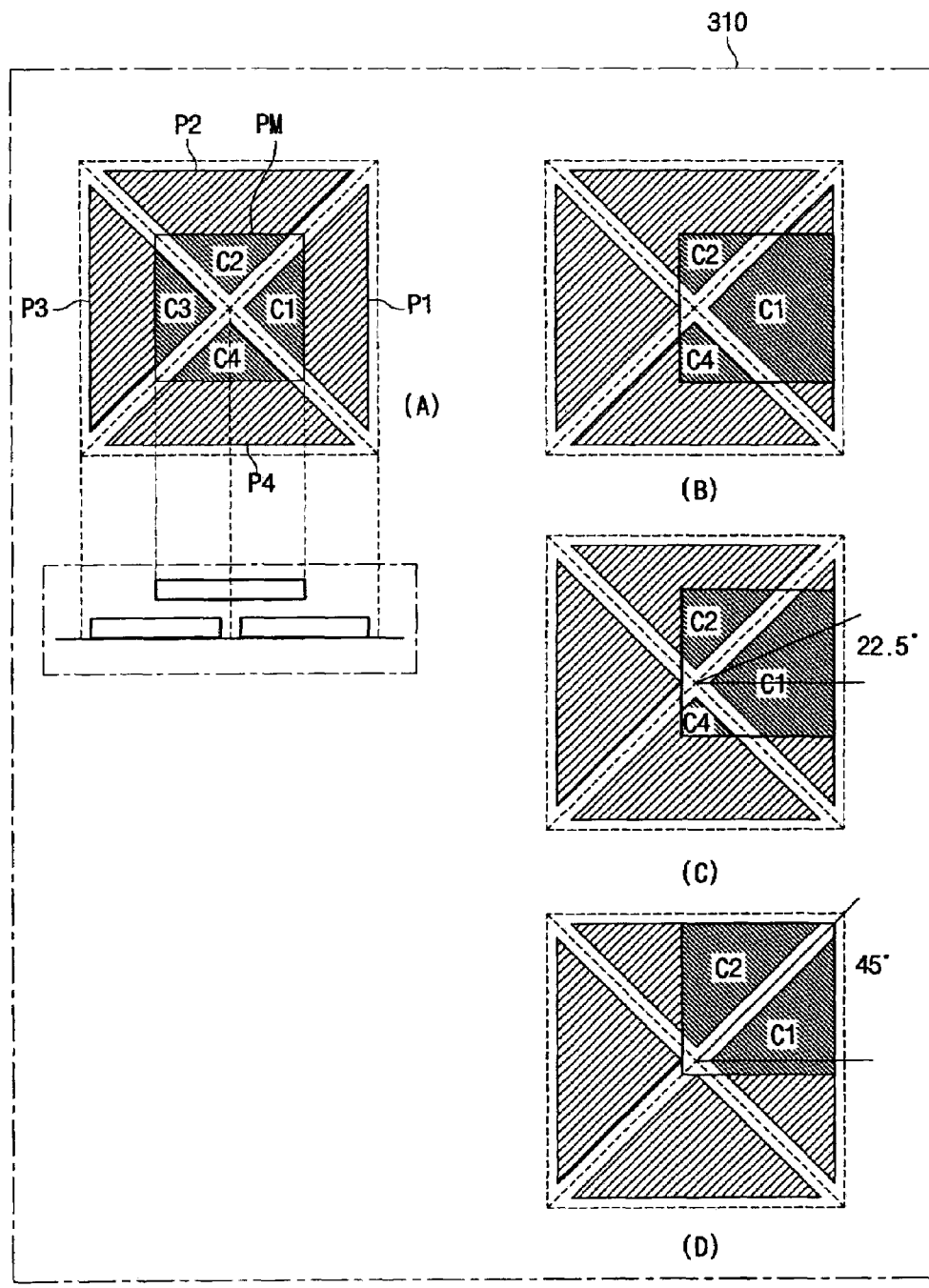
FIG. 9 shows cross-sectional views of a structure and sensing method of a capacitance sensor of FIG. 8.

FIG. 9 shows cross-sectional views of a structure and sensing method of the capacitance sensor 310 of FIG. 8.

The structure of the capacitance sensor 310 includes four electrodes P1~P4 uniformly divided on a lower side and a movable electrode PM on an upper side. Capacitances C1~C4 can be present between the upper and lower electrodes. The upper electrode PM is connected to a bar handle (not shown). The handle is connected to an elastic material (not shown). The bar handle is movable by the user's hand. When the bar handle connected to the elastic material is not in contact with the user's hand, the handle is located at a center position between the uniformly divided four electrodes P1~P4.

TABLE 2

|    | A  | B    | C  | D  |
|----|----|------|----|----|
| C1 | 25 | 75   | 65 | 50 |
| C2 | 25 | 12.5 | 30 | 50 |
| C3 | 25 | 0    | 0  | 0  |
| C4 | 25 | 12.5 | 5  | 0  |

It is assumed that a total of capacitance of the upper electrode is 100 when an interval between the lower electrodes is neglected. In FIG. 9(A), the capacitances C1~C4 between the upper and lower electrodes have the same value. If the capacitances C1~C4 have the values shown in column A of Table 2, it means that the user's motion is absent. In FIG. 9(B), the capacitances C1~C4 have the values shown in column B of Table 2 and indicate that the user's motion is in a positive direction of the X axis.

In FIG. 9(C), the capacitances C1~C4 have the values shown in the column C of Table 2 and indicate that the user's motion is in a direction of 22.5°. In FIG. 9(D), the capacitances C1~C4 have the values shown in the column D of Table 2 and indicate that the user's motion is in a direction of 45°.

Figure 10:
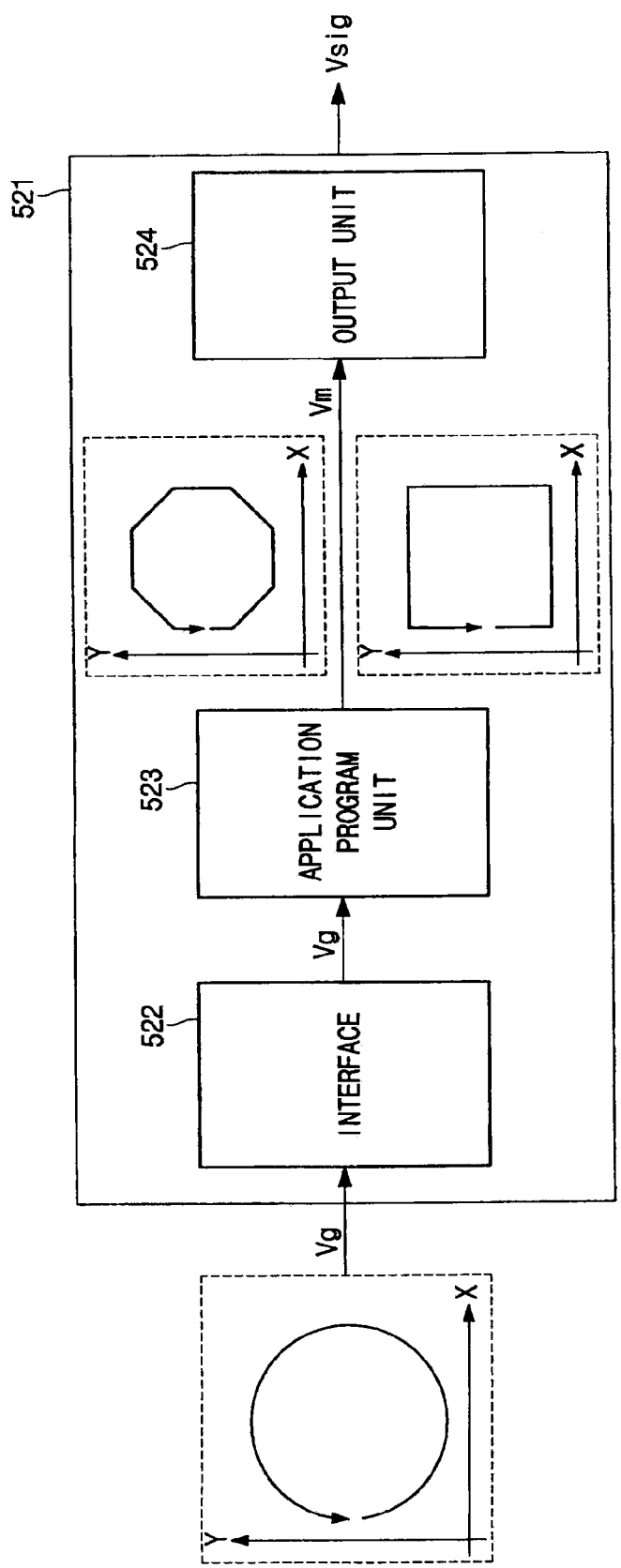
FIG. 10 is a block diagram of a pointing device according to a third exemplary embodiment of the present invention.

FIG. 10 is a block diagram of a pointing device according to a third exemplary embodiment of the present invention. A pointing device 521 includes an interface 522, an application program unit 523, and an output unit 524.

The pointing device 521 equipped with the built-in application program of FIG. 10 will be described with reference to FIGS. 3, 5, and 7.

The interface 522 receives a motion value Vg from the other pointing device 111 and outputs the motion value Vg.

The application program unit 523 receives the motion value Vg output from the interface 522 and converts it into a conversion motion value Vm using the motion-direction calculating method and the motion-magnitude calculating method of FIGS. 5 and 7. The application program unit 523 may comprise memory that stores an application program.

At this time, in the motion-direction calculating method of FIG. 5, the angle and magnitude of input motion data can be converted and the conversion motion values Vm can be output in eight directions or four directions.

The output unit 524 receives the conversion motion value Vm output from the application program unit 523 and outputs a video signal Vsig.

The pointing device (for example, a computer) equipped with the application program calculates the angle and magnitude of an input motion value using the motion-direction calculating method and the motion-magnitude calculating method of FIGS. 5 and 7, and outputs a video signal corresponding to the conversion motion value Vm in the eight or four directions.

The input motion value can be the motion value Vg input to the pointing device 521 or the conversion motion value Vm serving as the output of the pointing device.

Figure 11A:
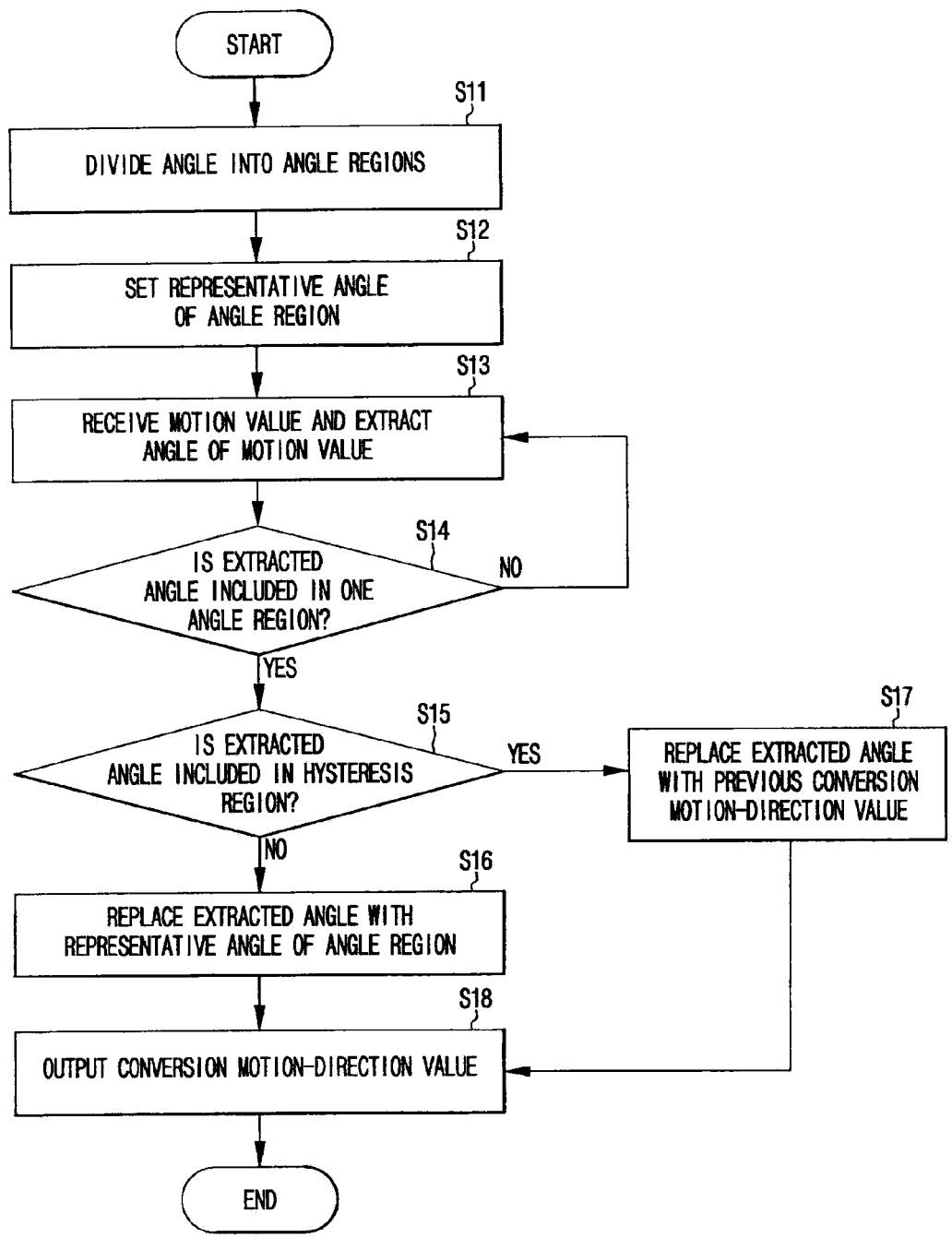
FIG. 11A is a flowchart showing a motion-direction calculating method of an application program unit according to the third exemplary embodiment of FIG. 9.

FIG. 11A is a flowchart showing a motion-direction calculating method of the application program according to the third exemplary embodiment of FIG. 9.

In step S11, an angle of 360° of the X-Y coordinate system is divided into I angle regions (where I is an integer less than or equal to 360).

In step S12, a representative angle is set in each of the I angle regions.

In step S13, an angle is extracted from a motion value input from the interface of FIG. 10.

In step S14, it is determined whether the extracted angle of step S13 is included in one of the angle regions. When the extracted angle is included in one of the angle regions, the procedure goes to step S15. Otherwise, the procedure returns to step S13 to extract an angle from the next motion value.

In step S15, it is determined whether the extracted angle is included in a hysteresis region (±5°) in the vicinity of a boundary between angle regions. When the extracted angle is included in the hysteresis region, the procedure goes to step S17. When the extracted angle is not included in the hysteresis region, the procedure goes to step S16.

In step S16, an angle region mapped to the angle extracted from the motion value is selected and the extracted angle is replaced with a representative angle of the selected angle region and set the representative angle to the conversion motion-direction value.

In step S17, the extracted angle is replaced with a previous conversion motion-direction value and set the previous conversion motion-direction value to the conversion motion-direction value.

In step S18, output the conversion motion-direction value.

Figure 11B:
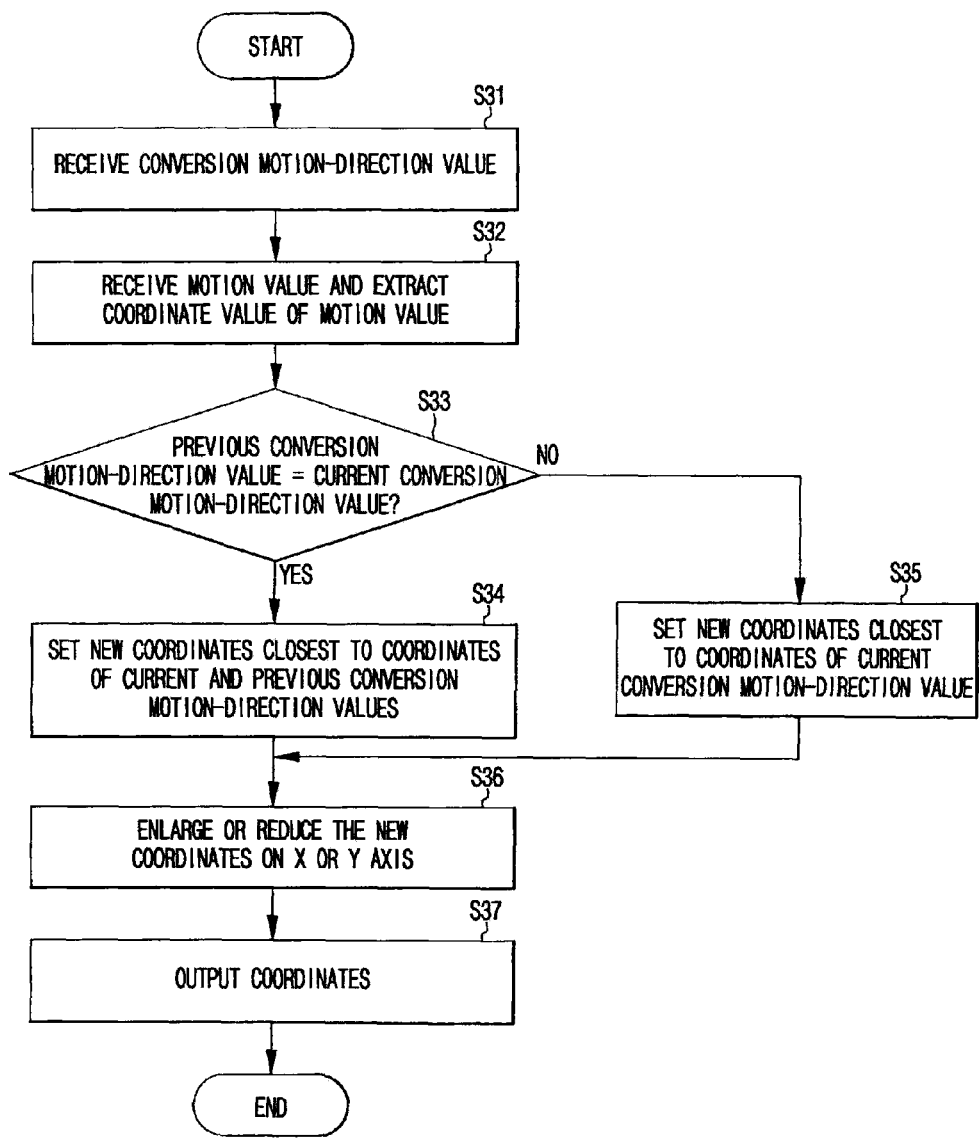
FIG. 11B is a flowchart showing a motion-magnitude calculating method of an application program unit according to the third exemplary embodiment of FIG. 9.

FIG. 11B is a flowchart showing a motion-magnitude calculating method of the application program according to the third exemplary embodiment of FIG. 9.

In step S31, the conversion motion-direction value of the output step of FIG. 11A is received.

In step S32, a coordinate value is extracted from the motion value input from the interface of FIG. 10.

In step S33, it is determined whether a previous conversion motion-direction value and a current conversion motion-direction value are the same. When the previous and current conversion motion-direction values are the same, the procedure goes to step S34. When the previous conversion motion-direction value is different from the current conversion motion-direction value, the procedure goes to step S35.

When the previous and current conversion motion-direction values are the same, new coordinates closest to coordinates of the current conversion motion-direction value and the previous conversion motion-direction value are set in step S34.

When the previous conversion motion-direction value is different from the current conversion motion-direction value, new coordinates closest to coordinates of the current conversion motion-direction value are set in step S35.

In step S36, a coordinate scaling operation is performed to enlarge or reduce the new coordinates by multiplying an X- or Y-axis value of the new coordinates by a given ratio or a value of a given table.

In step S37, coordinates are output by converting the scaled new coordinates into coordinates of an angle conversion value.

The coordinate scaling operation of step S36 can be performed before the operation for comparing the angle conversion values in step S33.

According to exemplary embodiments of the present invention, a pointing device can provide a positioning operation suitable for a motion intended by a user by limiting a motion angle. In particular, when the user controls a pointer in a device using a touch screen, fatigue of the user's finger can be reduced.

The user can optionally use a motion value calculating method in all directions according to need.

While the present invention has been shown and described in connection with exemplary embodiments thereof, it will be apparent to those skilled in the art that various changes can be made without departing from the spirit and scope of the invention as defined by the appended claims.

What is claimed is:

1. A pointing device comprising:
   a sensor that generates a motion detection signal by sensing motion;
   a calculator that receives the motion detection signal, calculates a motion value based on the motion detection signal, calculates a conversion motion value based on an angle of the motion value, and outputs the conversion motion value; and
   an interface that outputs the conversion motion value inputted from the calculator,
   wherein the calculator comprises:
   a motion value calculator that receives the motion detection signal, calculates the motion value by comparing a current motion detection signal with a previous motion detection signal, and outputs the motion value; and
   a conversion motion value calculator that receives the motion value, calculates the conversion motion value based on the angle of the motion value, and outputs the conversion motion value,
   wherein the conversion motion value calculator comprises:
   a motion-direction calculating module that divides an angle of 360 degrees into a plurality of angle regions, sets a representative angle of each region, calculates a conversion motion-direction value based on the representative angle by computing the angle of the motion value, and outputs the conversion motion-direction value;
   a motion-magnitude calculating module that receives the motion value, computes a horizontal component and a vertical component of the motion value, calculates a conversion motion-magnitude value by modifying the horizontal component and/or the vertical component, and outputs the conversion motion-magnitude value; and
   an output control module that outputs the conversion motion value by combining the conversion motion-direction value and the conversion motion-magnitude value.

2. The pointing device of claim 1, wherein the sensor comprises:
   an image sensor that receives light reflected from an object and outputs the motion detection signal corresponding to an amount of light received.

3. The pointing device of claim 1, wherein the sensor comprises:
   lower electrodes arranged on a lower side;
   a movable upper electrode arranged on an upper side and having a capacitance value with respect to the lower electrodes; and
   a capacitance sensor that outputs the capacitance value, which varies when the upper electrode is moved in response to a control motion of a user, as the motion detection signal.

4. The pointing device of claim 3, wherein the capacitance sensor is connected to a bar handle that is movable by the user and is connected to an elastic material,
   wherein the upper electrode is located at a center position of the lower electrodes when no force is applied.

5. The pointing device of claim 1, wherein the motion value calculator comprises:
   an analog-to-digital (A/D) converter that receives the motion detection signal and converts it into a digital signal;
   a memory that receives and stores a current digital signal and a previous digital signal output from the A/D converter; and
   an image processor that receives the current digital signal and the previous digital signal from the memory, calculates the motion value by comparing the current digital signal with the previous digital signal, and outputs the motion value.

6. The pointing device of claim 1, wherein when the angle of the motion value is located in a hysteresis angle region, the motion-direction calculating module sets a previous conversion motion-direction value to the conversion motion-direction value.

7. The pointing device of claim 1, wherein the motion-magnitude calculating module additionally receives the conversion motion-direction value, computes a magnitude of the motion value, and modifies the horizontal component and/or the vertical component to components of coordinates that has the closest magnitude to the magnitude of the motion value among coordinates of the conversion motion-direction value, respectively.

8. The pointing device of claim 1, wherein the motion-magnitude calculating module additionally receives the conversion motion-direction value, and modifies the horizontal component and/or the vertical component to components of the closest coordinates to coordinates corresponding to the motion value among coordinates of the conversion motion-direction value, respectively.

9. The pointing device of claim 8, wherein when the closest coordinates to coordinates corresponding to the motion value is two, the motion-magnitude calculating module selects coordinates close to coordinates corresponding to previous conversion motion value, and modifies the horizontal component and/or the vertical component to components of selected coordinates, respectively.

10. The pointing device of claim 1, wherein the motion-magnitude calculating module calculates the conversion motion-magnitude value by reducing the horizontal component and/or increasing the vertical component.

11. The pointing device of claim 1, further comprising:
    a motion-magnitude calculating module that receives the conversion motion value from the calculator and outputs the conversion motion value to the interface after performing at least one of an operation for adjusting a horizontal component of the conversion motion value to be smaller than a vertical component and an operation for adjusting the vertical component to be smaller than the horizontal component.

12. A pointing device comprising:
    an interface that receives a motion value from a device that outputs the motion value, and outputs the motion value;
    an application program unit that receives the motion value from the interface, computes an angle of the motion value, computes a conversion motion value based on the angle of the motion value, and outputs the conversion motion value; and
    an output unit that receives the conversion motion value from the application program unit and outputs a video signal corresponding thereto,
    wherein the application program unit divides an angle of 360 degrees into a plurality of angle regions, sets a representative angle of each region, calculates a conversion motion-direction value based on the representative angle by computing the angle of the motion value, computes a horizontal component and a vertical component of the motion value, calculates a conversion motion-magnitude value by modifying the horizontal component and/or the vertical component referring to the conversion motion-direction value, and outputs the conversion motion value by combining the conversion motion-direction value and the conversion motion-magnitude value.

13. The pointing device of claim 12, wherein the application program unit outputs the conversion motion value after reducing a horizontal component of the conversion motion value and/or increasing a vertical component of the conversion motion value.

* * * * *